United States Patent
Oh et al.

(10) Patent No.: US 9,232,505 B2
(45) Date of Patent: Jan. 5, 2016

(54) METHOD OF GENERATING PACKET, METHOD OF TRANSMITTING PACKET, AND METHOD OF RANGING OF PHYSICAL LAYER TRANSMITTER OF WIRELESS PERSONAL AREA NETWORK SYSTEM

(71) Applicant: Electronics and Telecommunications Research Institute, Daejeon (KR)

(72) Inventors: Mi Kyung Oh, Daejeon (KR); cheol-ho Shin, Daejeon (KR); Young Ae Jeon, Daejeon (KR); Sangsung Choi, Daejeon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 130 days.

(21) Appl. No.: 13/938,772

(22) Filed: Jul. 10, 2013

(65) Prior Publication Data

US 2014/0016653 A1   Jan. 16, 2014

(30) Foreign Application Priority Data

Jul. 10, 2012  (KR) .................. 10-2012-0074832
Jun. 4, 2013   (KR) .................. 10-2013-0064282

(51) Int. Cl.
*H04J 3/24*   (2006.01)
*H04W 72/04*  (2009.01)
*H04W 56/00*  (2009.01)

(52) U.S. Cl.
CPC ........ *H04W 72/0406* (2013.01); *H04W 56/001* (2013.01)

(58) Field of Classification Search
None
See application file for complete search history.

(56) References Cited

U.S. PATENT DOCUMENTS

| | | | |
|---|---|---|---|
| 8,160,103 B2 * | 4/2012 | Oh et al. .................. | 370/474 |
| 2008/0259896 A1 * | 10/2008 | Sahinoglu et al. ........... | 370/345 |
| 2011/0002416 A1 | 1/2011 | Shin et al. | |
| 2011/0103219 A1 | 5/2011 | Lee et al. | |
| 2011/0116534 A1 * | 5/2011 | Seibert et al. ................ | 375/224 |

FOREIGN PATENT DOCUMENTS

| | | |
|---|---|---|
| KR | 10-0634979 | 10/2006 |
| KR | 10-2011-0002776 | 1/2011 |
| KR | 10-2011-0049670 | 5/2011 |
| KR | 10-2011-0058392 | 6/2011 |

* cited by examiner

*Primary Examiner* — Minh-Trang Nguyen
(74) *Attorney, Agent, or Firm* — Nelson, Mullins Riley & Scarborough LLP

(57) ABSTRACT

A method of generating a packet of a physical layer transmitter of a TV white space (TVWS) wireless personal area network (WPAN) system operating a WPAN service in TVWS is provided. A packet that is generated by the method of generating the packet includes a preamble, a start frame delimiter that is positioned after the preamble, a first physical layer header that is positioned after the start frame delimiter, and a physical layer service data unit that is positioned after the first physical layer header. Here, the first physical layer header represents whether the packet is a ranging packet for ranging, and includes a ranging packet identification bit corresponding to a reserved bit of the second physical layer header in a SUN system and a LECIM system, and a parity bit.

20 Claims, 10 Drawing Sheets

FIG.2

PH10      IEEE 802.15.4m TVWS WPAN FSK PHR

| Bit string index | 0 | 1 | 2 | 3 | 4 | 5-15 |
|---|---|---|---|---|---|---|
| Bit mapping | 0/1 | Parity | RNG | FCS | DW | $L_{10}$-$L_0$ |
| Field name | Mode Switch/ PHR Length | Parity | Ranging packet | FCS type | Data Whitening | Frame Length |
| PHR | | | | | | |

PH20      IEEE 802.15.4g SUN FSK PHR

| Bit string index | 0 | 1-2 | 3 | 4 | 5-15 |
|---|---|---|---|---|---|
| Bit mapping | MS | $R_1$-$R_0$ | FCS | DW | $L_{10}$-$L_0$ |
| Field name | Mode Switch | Reserved | FCS type | Data Whitening | Frame Length |

PH30      IEEE 802.15.4k LECIM FSK PHR

| Bit string index | 0 | 1 | 2-4 | 5-15 |
|---|---|---|---|---|
| Bit mapping | PHRL = 1 | Parity | $R_2$-$R_0$ | $L_{10}$-$L_0$ |
| Field name | PHR Length | Parity | Reserved | Frame Length |

METHOD OF GENERATING PACKET, METHOD OF TRANSMITTING PACKET, AND METHOD OF RANGING OF PHYSICAL LAYER TRANSMITTER OF WIRELESS PERSONAL AREA NETWORK SYSTEM

CROSS-REFERENCE TO RELATED APPLICATION

This application claims priority to and the benefit of Korean Patent Application Nos. 10-2012-0074832 and 10-2013-0064282 filed in the Korean Intellectual Property Office on Jul. 10, 2012 and Jun. 4, 2013, the entire contents of which are incorporated herein by reference.

BACKGROUND OF THE INVENTION (a) Field of the Invention

The present invention relates to a physical layer transmitter/receiver of a TV white space (TVWS) wireless personal area network (WPAN) system for operating a WPAN service in TVWS. More specifically, the present invention relates to a method of generating a packet, a method of transmitting/receiving a packet, and a method of ranging a physical layer transmitter/receiver of a TVWS WPAN system.

(b) Description of the Related Art

It is expected that a wireless traffic use amount of the entire world will increase by two times or more every year. At individual space including a home area, as wireless devices using an unlicensed frequency such as 2.4 GHz industrial scientific and medical band (ISM band) rapidly increase, quality deterioration of wireless communication is serious due to interference and thus importance of development of a new idle frequency and development of WPAN technology that can intelligently integrate/manage the idle frequency is emphasized. TVWS is a frequency resource that can randomly access a wideband using a database after being converted to a DTV. TVWS has a remarkably lower security and interference possibility than a presently defined fixed and open band, and may thus conveniently and safely provide various high quality wireless-based application services. Therefore, for activation of a home network, development of TVWS WPAN communication technology is seriously requested.

Currently, in TVWS, IEEE 802.15.4m TVWS WPAN wireless transmission technology standardization for a WPAN service has started and thus standardization of a physical layer (PHY) and media access control layer (MAC) has started. As the American Federal Communications Commission (FCC) enacted a final rule that supplements a TVWS technology reference in September of 2010, when a frequency of a UHF or VHF band satisfies a preliminary regulation condition of the FCC, the frequency was declared to be an unlicensed band that everybody can use and it was approved for access to TVWS based on a database without sensing. Therefore, in order to protect a broadcasting signal of existing primary users, standardization of a TVWS WPAN system that satisfies a TVWS regulation is the largest issue of IEEE 802.15.4m TVWS WPAN standardization.

TVWS regulations include a regulation in which a TV band device (TVBD) should necessarily have location capability within an error level of ±50 m in relation to access to a database. Location capability is an ability to determine whether a TVWS channel is effective in an area in which a TV band device (TVBD) exists. First location capability may be performed using a GPS, but when GPS information cannot be used due to a weak radio area (e.g., indoors and in canyons) in which a GPS satellite is not viewed or GPS jamming, the first location capability cannot acquire location information. Thereby, in TVWS, a WPAN service is stopped. Therefore, for a seamless WPAN service within a TVWS band, a TVWS WPAN transmitting apparatus that can use a location recognition function using an RF signal and a location recognition function using a GPS together rather than performing location recognition by depending on a GPS is necessary.

SUMMARY OF THE INVENTION

The present invention has been made in an effort to provide a TVWS WPAN transmitting/receiving apparatus having advantages of constituting a TVWS WPAN system that satisfies a TVWS regulation and having location capability.

An exemplary embodiment of the present invention provides a method of generating a packet of a physical layer transmitter of a WPAN system that operates a WPAN service in TVWS. The method includes: forming a preamble; forming a start frame delimiter (SFD) that is positioned after the preamble and that represents the start of a frame; forming a first physical layer header that is positioned after the SFD; and forming a physical layer data unit (PSDU) that is positioned after the first physical layer header. The forming of a first physical layer header includes inserting a ranging packet identification bit representing whether a packet is a ranging packet for ranging and corresponding to a reserved bit of a second physical layer header in a smart utility network (SUN) system and a low energy critical infrastructure monitoring (LECIM) system and a parity bit into the first physical layer header.

The first physical layer header may correspond to a mode switch bit of the second physical layer header in the SUN system, and may include a first bit corresponding to a physical layer header length bit of the second physical layer header in the LECIM system. The forming of a first physical layer header may further include setting the first bit to 0 for compatibility with the SUN system and setting the first bit to 1 for compatibility with the LECIM system.

The forming of a first physical layer header may further include inserting an FCS type bit representing a type of a frame check sequence (FCS) for detecting a transmission error, a data whitening bit, and a frame length bit representing a frame length into the first physical layer header.

The forming of an SFD may include selecting an SFD sequence of a 2-byte size for compatibility with the SUN system and selecting an SFD sequence of a 3-byte size for compatibility with the LECIM system.

The forming of a PSDU may include inserting a null value in which a location thereof is a reference location in which channel state monitoring is performed into the PSDU.

The forming of a PSDU may include inserting a ranging sequence into the PSDU when the packet is the ranging packet.

The inserting of a ranging sequence into the PSDU may include inserting the ranging sequence immediately after the first physical layer header.

The inserting of a ranging sequence into the PSDU may further include inserting the ranging sequence into a point that is separated by a predetermined distance from a start location of the PSDU.

The ranging sequence may be a sequence in which 0 and 1 are alternately repeated.

The inserting of a ranging sequence into the PSDU may further include inserting a bit pattern in which "10" is repeated when an immediately preceding bit of a point into which the ranging sequence is inserted is 0, and inserting a bit pattern in which "01" is repeated when an immediately preceding bit of a point into which the ranging sequence is inserted is 1.

A start point of the ranging sequence may become a first reference point for estimating a packet time of arrival (TOA) that is used for ranging.

The preamble may have a bit pattern in which 0 and 1 are alternately repeated, and a portion of the preamble may be used as a ranging sequence when the packet is the ranging packet.

A start location of the SFD may become a first reference point for estimating a packet TOA that is used for ranging.

Another embodiment of the present invention provides a method of transmitting a packet of a physical layer transmitter of a WPAN system. The method includes: generating a packet including a preamble, an SFD, a first physical layer header, and a PSDU; and modulating and transmitting the generated packet. The generating of a packet includes inserting a ranging packet identification bit that represents whether the packet is a ranging packet for ranging and that corresponds to a reserved bit of a second physical layer header in an SUN system and a low energy critical infrastructure monitoring (LECIM) system and a parity bit into the first physical layer header.

Yet another embodiment of the present invention provides a method of ranging a physical layer transmitter of a WPAN system. The method includes: transmitting a ranging packet including a synchronization header (SHR) for synchronization with a receiver, a physical layer header including a ranging packet identification bit representing that a packet is a ranging packet for ranging and a parity bit, and a PSDU into which a first ranging sequence in which 0 and 1 are alternately repeated is inserted, to the receiver; receiving a response packet including a second ranging sequence in which 0 and 1 are alternately repeated, from the receiver; estimating a packet TOA using a symbol transition time point of the second ranging sequence; and calculating a time of flight (TOF) to the receiver using the estimated TOA.

BRIEF DESCRIPTION OF THE DRAWINGS

FIG. 2 is a diagram illustrating a structure of a physical layer header according to an exemplary embodiment of the present invention.

DETAILED DESCRIPTION OF THE EMBODIMENTS

Figure 1:
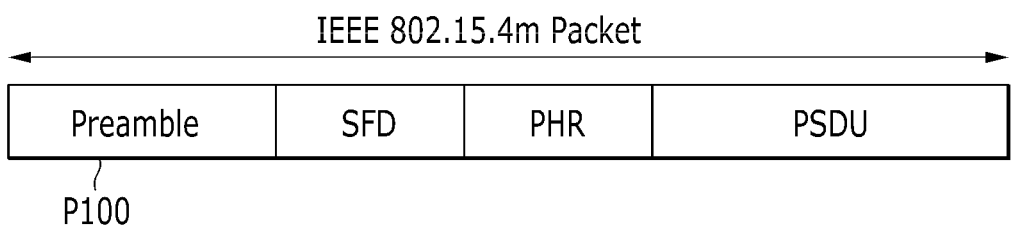
FIG. 1 is a diagram illustrating a structure of a TVWS WPAN packet according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In a recently performing IEEE 802.15.4m TVWS WPAN standard, in a TVWS frequency band, a typical data rate of 40 Kbps-2 Mbps and an optional data rate of 10 Mbps are set as a target. In an IEEE 802.15.4m TVWS WPAN standard, a physical layer (PHY) and media access control layer (MAC) specification to apply to various application communication technologies such as SUN, infrastructure monitoring networks, intelligent transportation systems, and surveillance control and monitoring networks is determined. Therefore, because it is difficult for a single PHY to entirely cover various application communication technologies, an FSK PHY with low speed/low complexity using frequency shift keying (FSK) modulation and an OFDM PHY with high speed/high reliability using orthogonal frequency division multiplexing (OFDM) modulation have been in the spotlight as a candidate.

The FSK PHY with low speed/low complexity does not require a high-linearity power amplifier and does not require tracking of a phase of a carrier. Further, in the FSK PHY, because a performance difference between a coherent receiver and a non-coherent receiver is only 1 dB, there is a merit that a non-coherent receiver with low complexity can be embodied. Because the FSK PHY is an already verified PHY that IEEE 802.15.4 g SUN and IEEE 802.15.4 k have introduced, the FSK PHY is generally PHY technology that is appropriate for a battery-powered mode I TVBD. In contrast, the OFDM PHY with high speed/high reliability can perform reliable communication in a multipath channel environment and is advantageous for high-rate data transmission of a several Mbps level. Therefore, the OFDM PHY is appropriate PHY technology for a mode II TVBD that performs a coordinator function.

A TVBD receives information about an empty channel in which a broadcasting service, which is a primary user in a TVWS band does not use from a database, receives allocation of the empty channel, and uses the empty channel. Therefore, a fixed device (TVBD) at a fixed location, and a mode II TVBD, which is a portable/personal terminal, should have a function that can always access a database based on location information thereof. In this way, because the TVBD receives allocation of an empty TVWS band, in an uncomplicated rural area, it is relatively easy to find a TVWS channel; because there are many empty channels, the TVBD is free from interference; and because it is easy to satisfy a TVWS regulation, the TVBD can transmit at a maximum of 100 mW. However, in a metropolitan area such as a large city, it is difficult to find an empty TVWS channel due to relaying of a broadcasting signal for removing a weak radio area, and when the TVBD receives allocation of a channel adjacent to a channel in which a TV service is operating, the TVBD is limited to transmit at a maximum of 40 mW. Further, in an empty TVWS band, because several services like a wireless local area network (WLAN) as well as the WPAN are allocated, communication quality is deteriorated due to interference. This means that, as a sub-1 GHz band, a TVWS band that is known as having good propagation characteristics, in an urban area, reliability may be deteriorated according to TVWS regulation. Therefore, even in a metropolitan area, in order to smoothly provide a TVWS WPAN service, wireless communication technology in which reliability is improved is necessary.

Further, because a TVWS channel is not always effective, for a seamless TVWS WPAN service, wireless communication in a band (e.g., 900 MHz band) other than a TVWS band should be considered. That is, when the TVBD receives allocation of a TVWS channel and receives information that the channel is no longer effective from a database while maintaining a service, the TVBD should stop wireless communication in TVWS. In this case, switching to a 900 MHz band is important in maintaining a seamless service. Therefore, a TVWS WPAN PHY standard is necessary to maintain interoperability with a standard such as IEEE 802.15.4 g SUN or IEEE 802.15.4 k low energy critical infrastructure monitoring (LECIM) that have already been standardized in a 900 MHz band.

Therefore, an FSK PHY of a TVWS WPAN system according to an exemplary embodiment of the present invention forms a transmitting terminal for compatibility with a SUN system or a LECIM system. A structure of a packet that is generated by an FSK PHY transmitter according to an exemplary embodiment of the present invention will be described with reference to FIG. 1.

FIG. 1 is a diagram illustrating a structure of a TVWS WPAN packet according to an exemplary embodiment of the present invention.

First, an FSK PHY of a TVWS WPAN system employs a 50 Kbps mode, which is a mandatory mode of an FSK PHY of a SUN system.

As shown in FIG. 1, a packet P100 includes a preamble, a start frame delimiter (SFD), a physical layer header (PHR), and a physical layer service data unit (PSDU).

The preamble has a bit pattern (e.g., 010101010) in which 0 and 1 are alternately repeated. The SFD has a specific pattern for notifying the start of a packet. The PHR includes information necessary for restoring the PSDU. The PSDU includes payload data and a cyclical redundancy check (CRC).

FIG. 2 is a diagram illustrating a specific structure of a PHR of FIG. 1.

For compatibility with the SUN system, in the PHR (PH10) according to an exemplary embodiment of the present invention, a bit string index (hereinafter referred to as an index) [3:15] is the same as a PHR (PH20) of the SUN system. That is, an index [3] is a bit FCS representing a type of a frame check sequence (FCS), an index [4] is a bit DW for data whitening, and an index [5:15] is bits $L_{10}$-$L_0$ representing a frame length.

An index [1], which was a reserved bit in the PHR (PH20), is used as a parity bit Parity in the PHR (PH10). An index [2], which was a reserved bit in the PHR (PH20) and the PHR (PH30), is used as a ranging packet identification bit RNG in the PHR (PH10). Here, the parity bit Parity may be used as an even parity bit (even parity) or an odd parity bit (odd parity), and may be used for detecting an error of the PHR (PH10). By preventing an unnecessary PSDU from being recovered through a parity bit Parity, power consumption can be reduced. A ranging packet identification bit RNG represents whether a corresponding packet is a ranging packet for ranging, and when the ranging packet identification bit RNG is 1, the ranging packet identification bit RNG may be designed to represent that a corresponding packet is a ranging packet.

An index [0] in the PHR (PH20) was a bit MS for a mode switch, and an index [0] in the PHR (PH30) was a physical layer header length bit PHRL, but an index [0] in the PHR (PH10) is set to 0 for compatibility with the SUN system and is set to 1 for compatibility with the LECIM system.

As shown in FIG. 2, when the PHR (PH10) is formed, in the TVWS WPAN system, a packet is received in consideration of a parity bit Parity and a ranging packet identification bit RNG, and in the SUN system, a packet is received without regard to the parity bit Parity and ranging packet identification bit RNG and thus compatibility of the TVWS WPAN system and the SUN system is achieved. FIG. 2 illustrates a bit representing a kind (e.g., LECIM, SUN) of a system, a bit (e.g., RNG) representing ranging, and a bit (e.g., parity) representing parity constituting the PHR (PH10) in a different order from an order that is shown in FIG. 2, and thus compatibility with the SUN system may be maintained.

The index [0] of the PHR (PH30) used in an FSK PHY of the LECIM system is a physical layer header length bit PHRL, the index [1] is a parity bit Parity, and the index [5:15] is bits $L_{10}$-$L_0$ representing a frame length. The TVWS WPAN system receives a packet in consideration of a ranging packet identification bit RNG, a bit FCS, and a bit DW, and the LECIM system receives a packet without regard to a ranging packet identification bit RNG, a bit FCS, and a bit DW, and thus compatibility of the TVWS WPAN system and the LECIM system is achieved.

For compatibility with the SUN system or the LECIM system, in addition to a PHR structure of FIG. 2, a process of selecting an SFD sequence is necessary. The SUN system uses a 2-byte SFD sequence, and the LECIM system uses a 3-byte SFD sequence in order to improve reliability. An FSK PHY of a TVWS WPAN system according to an exemplary embodiment of the present invention basically uses a 2-byte SFD sequence for compatibility with a mandatory mode of an FSK PHY of a SUN system, and additionally uses a 3-byte SFD sequence. That is, the FSK PHY of the TVWS WPAN system uses a 2-byte SFD sequence for compatibility with the SUN system and uses a 3-byte SFD sequence for compatibility with the LECIM system.

The number of SFD sequences may increase according to a kind (e.g., SUN system, LECIM system) of the WPAN for support in the TVWS, and analysis of a next PHR (PH10) may be changed according to an SFD sequence that is selected by a process of selecting an SFD sequence. Therefore, when the TVWS WPAN system is an optional mode that supports communication systems of different kinds, not a mandatory mode that supports the SUN system and the LECIM system, the packet P100 may be formed different from the form of FIGS. 1 and 2. Specifically, the PHR may be defined to have a location/different field different from the PHR (PH10) that is shown in FIGS. 1 and 2, but may include a parity bit Parity and a ranging packet identification bit RNG for verifying an error of the PHR. Further, a length and a sequence pattern of the SFD may be changed according to requirements of a supporting system.

Figure 3:
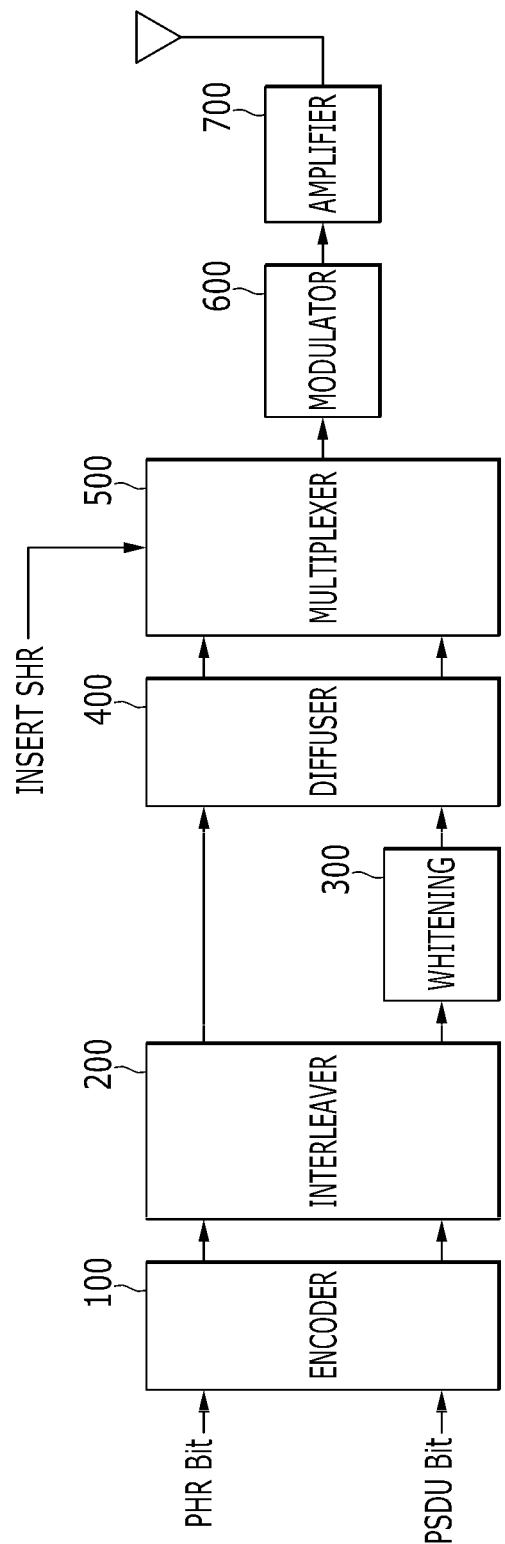
FIG. 3 is a diagram illustrating a packet flow in a transmitting terminal according to an exemplary embodiment of the present invention.

FIG. 3 is a diagram illustrating a packet flow in a transmitting terminal according to an exemplary embodiment of the present invention.

A PHR bit and a PSDU bit encode a channel in an encoder 100, and are interleaved in an interleaver 200. Here, the encoder 100 may be a convolutional encoder. Thereafter, a PSDU bit in which data whitening is performed by a data whitener 300 and an interleaved PHR bit are each spread via a diffuser 400, and are multiplexed together with an SHR that is inserted into a multiplexer 500. Thereafter, a multiplexed bit string is modulated through a modulator 600 and is transmitted via an amplifier 700. Here, the modulator 600 performs FSK modulation. Finally, an FSK PHY transmitter according to an exemplary embodiment of the present invention generates a packet by attaching a preamble and an SHR and a PHR (PH10) that are formed with an SFD (2-byte or 3-byte SFD) to a PSDU and transmits the generated packet.

An FSK PHY according to an exemplary embodiment of the present invention generally performs a function such as multiplexing by the multiplexer 500, FSK modulation by the modulator 600, and amplification by the amplifier 700, and additionally selects a reliability improving function. Here, a reliability improving function is a function such as channel encoding by the encoder 100, interleaving by the interleaver 200, whitening by the data whitener 300, and diffusion by the diffuser 400. The reliability improving function may be additionally selected based on TVWS regulation and a peripheral environment. That is, an FSK PHY according to an exemplary embodiment of the present invention generates and transmits a packet without a reliability improving function in an environment having little interference like a rural area, and when communication quality is deteriorated due to much interference like a metropolitan area, by additionally using a reliability improving function, the FSK PHY generates and transmits a packet.

In order to maintain compatibility with an OFDM PHY of the SUN system, the OFDM PHY of the TVWS WPAN system basically employs an OFDM PHY specification of the SUN system. Because the LECIM system has no OFDM PHY specification, compatibility of a TVWS WPAN system and an LECIM system cannot be maintained and thus compatibility of the TVWS WPAN system and the LECIM system is ignored. Because the OFDM PHY may be transmitted at a high speed, in a TVWS WPAN system, an optional data rate mode of 10 Mbps is formed using the OFDM PHY. It is advantageous to introduce the OFDM PHY in the TVWS WPAN system in various aspects. Various OFDM standard plans for an application communication field requiring a high data rate exist, and supporting a structure for compatibility with them is a function of an OFDM mode of a SUN system. As described above, as the FSK system (e.g., an FSK PHY of an LECIM system and an FSK PHY of a SUN system) is distinguished through an SFD, it is appropriate to divide each OFDM system based on a synchronization sequence that is specialized to each of an OFDM system of other kinds. However, in the FSK PHY or the OFDM PHY, when each system is not distinguished with a specific sequence, by analyzing specific bits at a known location like a specific header, it is preferable to distinguish each system.

In a TVWS band, when there is a function of monitoring a broadcasting user or interference, it helps in constituting a WPAN system. For example, when transmitting and receiving a large data amount, a channel is used for a long time, and in this case, it should be determined whether intervention of another communication system or use of a main user (e.g., TV broadcasting) is detected. Otherwise, performance of a system that is scheduled to originally operate is deteriorated due to interference, and other systems are similarly affected. That is, the systems interfere with each other as opposed to the intention of efficiently using a TVWS band. In order to prevent this, a channel that can communicate is selected, an interference level of a selected specific channel or a channel situation is monitored, and when operating a cooperation mode between mutual systems, a method of extracting necessary information is necessary. Because the OFDM PHY can generate a wideband signal and orthogonality is performed well between subcarriers, different subcarriers may be independently operated. By using this, the OFDM PHY can monitor a channel state using a null subcarrier in which null is inserted into a subcarrier. The null subcarrier may be distributed in a channel band in a subcarrier unit. Alternatively, by forming a subcarrier group, at least one specific subcarrier group may transmit null in a constant time unit. The OFDM PHY transmitter/receiver of the TVWS WPAN system monitors a channel based on a location of the null and performs a corresponding operation (scheduling, channel avoidance, and power adjustment) according to a monitored channel situation.

For channel state monitoring, a null subcarrier that is inserted into a symbol will be described with reference to FIG. 4.

Figure 4:
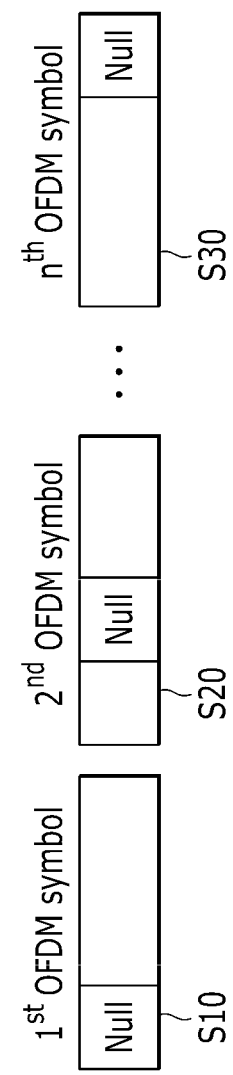
FIG. 4 is a diagram illustrating a null subcarrier for channel monitoring according to an exemplary embodiment of the present invention.

FIG. 4 is a diagram illustrating a null subcarrier for channel monitoring according to an exemplary embodiment of the present invention.

For channel state monitoring, a transmitting terminal sequentially hops a subcarrier or a subcarrier group for transmitting null on a channel basis, and inserts the subcarrier or the subcarrier group into OFDM symbols S10, S20, and S30. Locations of null subcarriers that are inserted into each of the OFDM symbols S10, S20, and S30 through hopping are different. As the transmitting terminal inserts a null subcarrier into several OFDM symbols S10, S20, and S30 and transmits it, a receiving terminal collects the several OFDM symbols S10, S20, and S30 and monitors a channel state via an entire band of the OFDM.

Even the FSK PHY transmits null for channel monitoring with a concept similar to subcarrier nulling in the OFDM PHY. That is, an FSK PHY transmitter of a TVWS WPAN system does not transmit an FSK symbol in at least one specific location and interrupts RF transmission. Because the FSK PHY has a low data rate, one packet may use a channel for a long time. In contrast, an FSK PHY transmitter/receiver monitors a channel based on a location of a null existing in a packet, and performs a corresponding operation (scheduling, channel avoidance, and power adjustment) according to a monitored channel situation.

In the foregoing description, a transmitting method of performing data communication using the FSK PHY and the OFDM PHY of the TVWS WPAN system has been described, but in order to have location capability, an additional function is necessary, and positioning is available based on ranging of high accuracy through the additional function. Whether a present packet is a ranging packet may be represented though a ranging packet identification bit RNG of a previous PHR (PH10), and whether a ranging packet exists may be distinguished with a length of an SFD or a kind of an SFD sequence without the ranging packet identification bit RNG. For example, it may be represented that a corresponding packet is a ranging packet through extension of a length of an SFD or repetition of an SFD.

In order to perform ranging by wireless in an asynchronous state using a TVWS WPAN packet, as two devices transmit and receive a message, there are a two way ranging (TWR) method based on a packet TOA that measures a TOF, and a method of converting a separation distance between two devices using a received signal strength indicator (RSSI) of a received signal. Because a method of using an RSSI is sensitively affected by a channel state and a peripheral environment, accuracy is not high. Therefore, the RSSI method may be used in a mode I TVBD wherein it is unnecessary to always provide location capability. However, in a fixed device or a mode II TVBD that requires accuracy of an error of ±50 m, it is advantageous to apply a TWR method.

Figure 5:
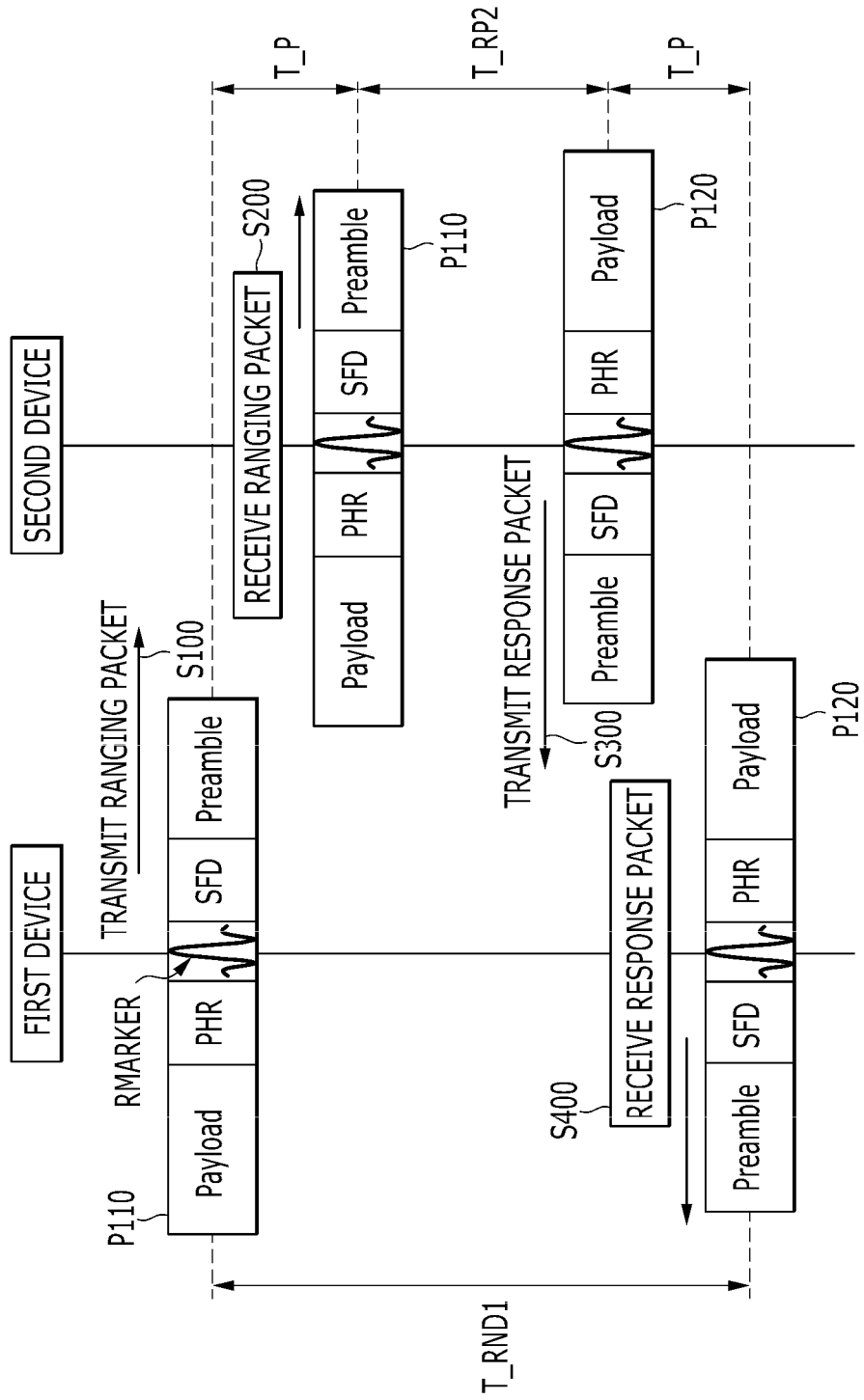
FIG. 5 is a diagram illustrating a ranging process according to an exemplary embodiment of the present invention.

FIG. 5 is a diagram illustrating a ranging process according to an exemplary embodiment of the present invention.

A TWR method first transmits a ranging packet P110 from the first device to the second device (S100). The second device receives the ranging packet P110 of the first device (S200) and transmits a response packet P120 to the received ranging packet P110 to the first device (S300). The first device receives the response packet P120 from the second device (S400). Here, the ranging packet P110 and the response packet P120 are formed to the same as the TVWS WPAN packet P100 of FIG. 1, and a ranging packet identification bit RNG of the PHR (PH10) is set to 1.

In this way, while sending and receiving a packet, the first device measures T_RND1 and the second device measures T_RP2, and the first device obtains T_P, which is a TOF between two devices through Equation 1 using T_RND1 and T_RP2. Here, T_RND1 is a propagation reciprocating time, which is a time that is taken until the first device receives the response packet P120 from the second device from after transmitting the ranging packet P110 to the second device, and T_RP2 is a response processing time of the second device.

$$T\_P=(T\_RND1-T\_RP2)/2 \quad \text{[Equation 1]}$$

When T_P is obtained through Equation 1, by multiplying a speed c of light by T_P, a distance between the first device and the second device is obtained. T_RND1 and T_RP2 are measured using a ranging counter that is provided in each device, and a reference that operates a ranging counter may be set to a location (e.g., RMARKER) that may be known in a packet. For example, in an IEEE 802.15.4a impulse radio ultra-wideband (IR-UWB) location recognition system, an operation reference of a ranging counter is defined as a first IR-UWB signal of the PHR.

For precise ranging in a TWR method, when receiving a packet, by estimating an accurate location of the RMARKER, a ranging counter should be operated. To estimate an accurate location of the RMARKER is to accurately estimate a TOA of a receiving packet. In TOA estimation, when a 1 ns error is converted to a distance, it is a 30 cm error, and in order to have accuracy of a 50 m error, a TOA estimation error should be of a 0.1 us level.

In general, because the FSK PHY is used for a low speed system, the FSK PHY uses a lower speed clock, and because the FSK PHY generally uses a non-coherent receiver, it is difficult to directly extract phase information from a received signal. Thereby, TOA estimation accuracy of the FSK PHY is not high. Therefore, in order to enhance TOA estimation accuracy, an FSK PHY transmitter/receiver of a TVWS WPAN system according to an exemplary embodiment of the present invention uses a method of extracting symbol transition information from a ranging sequence having a known repeated bit pattern. A method of extracting symbol transition information from a ranging sequence will be described with reference to FIGS. 6 to 11.

Figure 6:
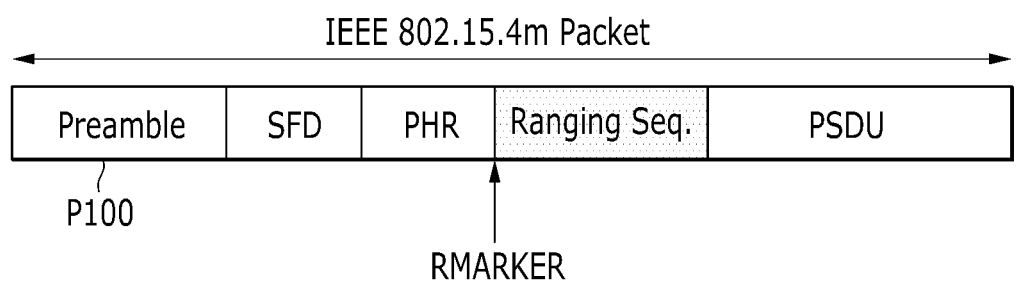
FIG. 6 is a diagram illustrating a ranging packet for ranging according to an exemplary embodiment of the present invention.

FIG. 6 is a diagram illustrating a ranging packet for ranging according to an exemplary embodiment of the present invention.

A known ranging sequence may be inserted into a point that is separated by a predetermined distance from a next point of the PHR (PH10) or a PSDU start location point. A start point of the ranging sequence may be determined to the RMARKER, which is a reference point. In FIG. 6, for convenience of description, at a next point of the PHR (PH10), a case in which a ranging sequence is inserted is illustrated. By operating a ranging counter based on the RMARKER, T_RND1 and T_RP2 are extracted.

A ranging sequence for an FSK signal may be a sequence having a bit pattern (e.g., 01010101) in which 0 and 1 are alternately repeated. Such a ranging sequence (e.g., 01010101) is effective in enhancing TOA estimation accuracy. A size of a ranging sequence essential factor may be differently designed according to requirements of a supporting system (e.g., a SUN system and a LECIM system). Specifically, immediately before inserting a ranging sequence, when a symbol is 0, 10101010 is repeatedly inserted, and immediately before inserting a ranging sequence, when a symbol is 1, 01010101 is repeatedly inserted.

A separate ranging sequence is not inserted into PSDU, and a portion of a preamble may be defined to a ranging sequence. In this case, a start location of an SFD may be defined to the RMARKER, or a location that is separated by a predetermined distance from a start location of an SFD may be defined to the RMARKER. In this case, a receiver should operate a ranging counter for an entire packet to correspond to a ranging operation.

Figure 7:
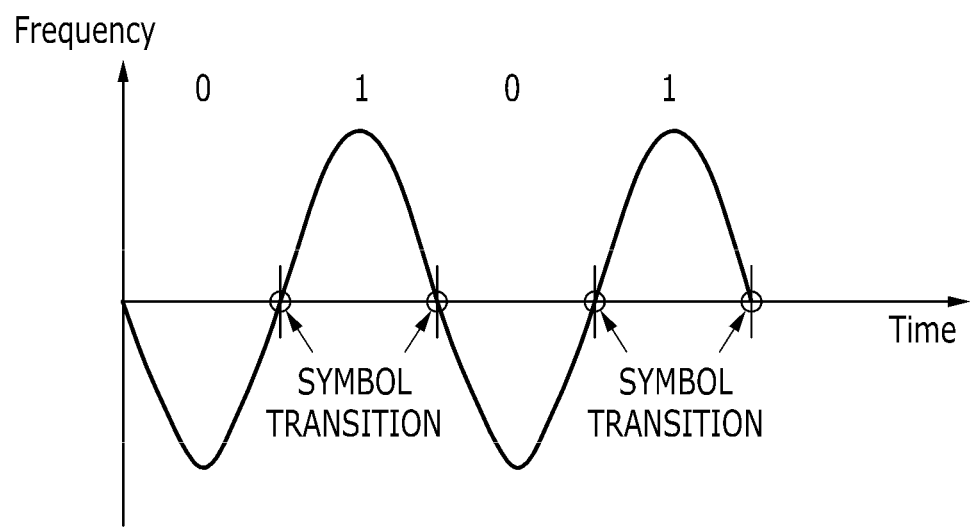
FIG. 7 is a graph illustrating a symbol transition time point of a ranging sequence that is used for estimating a packet TOA.

FIG. 7 is a graph illustrating a symbol transition time point of a ranging sequence that is used for a packet TOA.

In the FSK PHY, when transiting from 0 to 1 and when transiting from 1 to 0, a frequency is symmetrical, and thus by estimating a transition time point when transiting from 0 to 1 and when transiting from 1 to 0 by the 01010101 repetition pattern of a ranging sequence, a TOA may be estimated. A transition time point may be estimated with various methods, and hereinafter, a case of estimating a symbol transition time point through a phasor correlator will be described.

Figure 8:
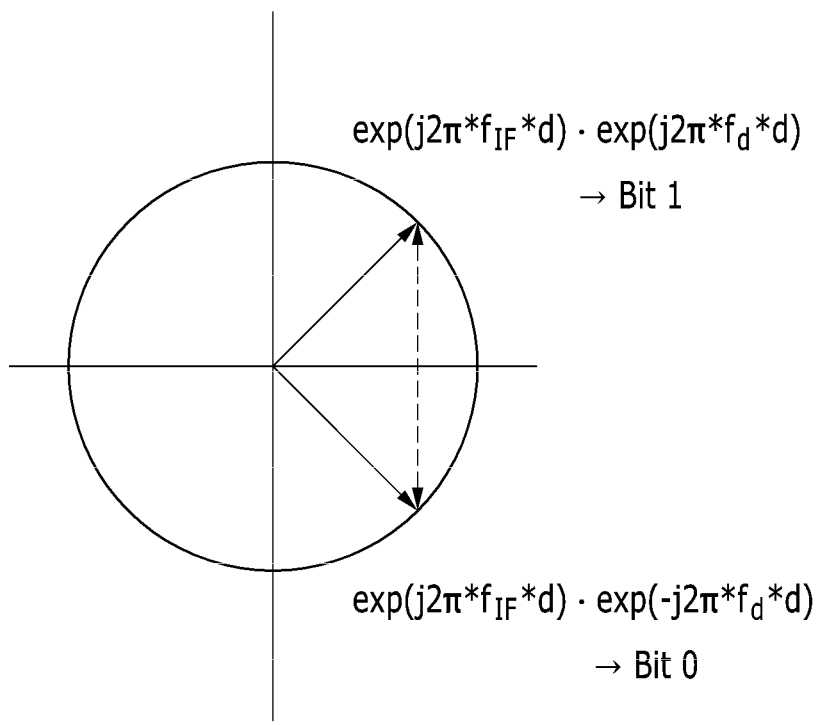
FIG. 8 is a schematic view illustrating a phasor that is output from a phasor correlator.

FIG. 8 is a schematic view illustrating a phasor that is output from a phasor correlator.

By multiplying an input digital signal and a conjugate complex number of a digital signal in which the digital signal is delayed in a time domain, the phasor correlator converts the digital signal to a phasor. The phasor correlator is a kind of FSK demodulator that distinguishes a frequency difference using phase measurement.

An FSK received signal r(t) is represented by Equation 2 in consideration of an intermediate frequency $f_{IF}$ and a frequency shift $f_d$.

$$r(t)=\exp(j2\pi*f*t) \quad \text{[Equation 2]}$$

In Equation 2, when a bit is 1, $f=f_{IF}+f_d$, and when a bit is 0, $f=f_{IF}-f_d$.

The phasor correlator converts the FSK received signal r(t) to a phasor using the FSK received signal r(t) and an FSK received signal r(t−d) having a phase difference of d from the FSK received signal r(t). The phasor represents a vector that is formed with a length and a phase angle in polar coordinates. That is, when the FSK received signal r(t) passes through the phasor correlator, an output signal of the phasor correlator is represented by Equation 3.

$$r(t)\cdot r^*(t-d)=\exp(j2\pi*f*d) \quad \text{[Equation 3]}$$

In Equation 3, when substituting a frequency corresponding to bits 1 and 0 to f, two phasors (a phasor corresponding to the bit 1 and a phasor corresponding to the bit 0) are shown, as shown in FIG. 8. A frequency difference may be distinguished from the phasor. Here, because $f_{IF}$ and d are determined values, $\exp(j2\pi*f_{IF}*d)$ is a constant complex. A delay d corresponding to a phase difference is determined to maximally separate two phasors of FIG. 8 and may be determined as in Equation 4.

$$d=\text{MAX}\{\exp(j2\pi*f*d)|_{f=f_{IF}+f_d}-\exp(j2\pi*f*d)|_{f=f_{IF}-f_d}\} \quad \text{[Equation 4]}$$

When d is obtained by Equation 4, d is $1/(4*f_d)$.

Figure 9:
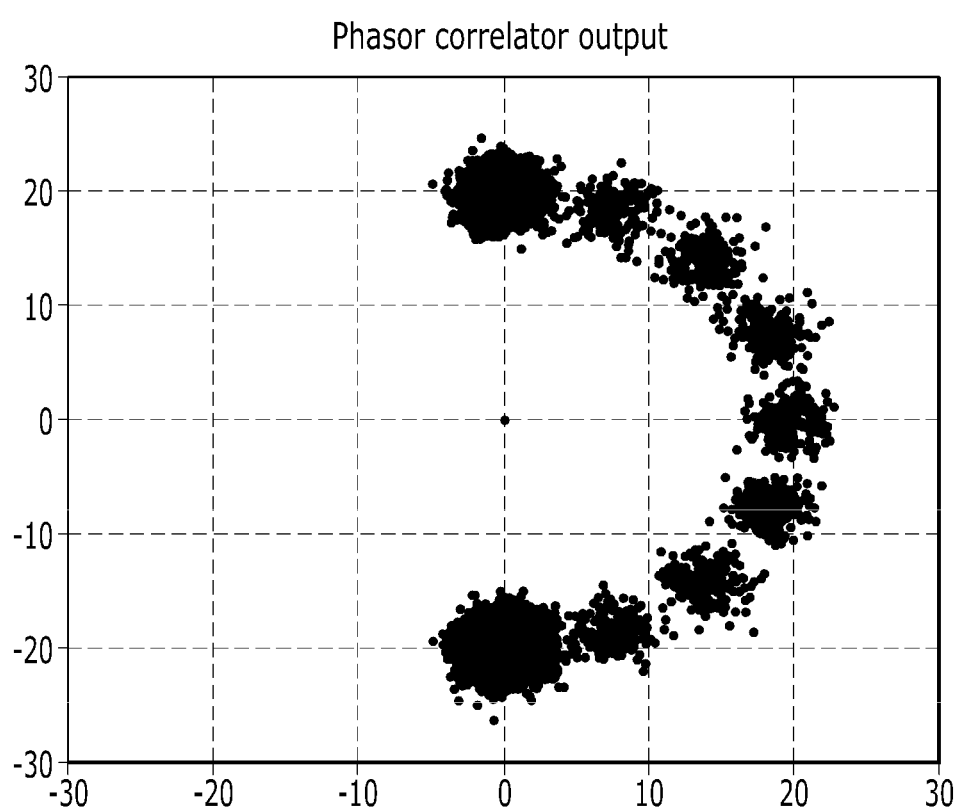
FIG. 9 is a graph illustrating an output value of a phasor correlator.

An output of the phasor correlator is shown in FIG. 9.

Figure 10:
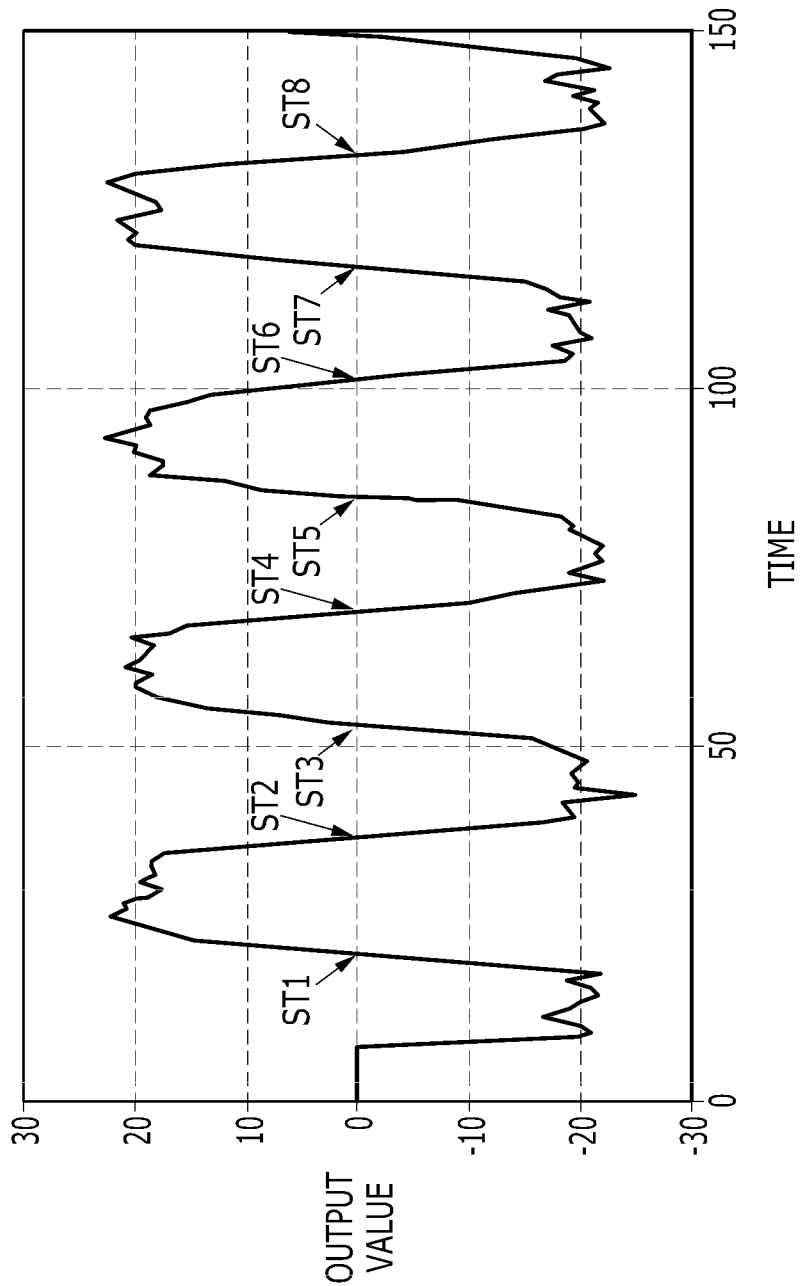
FIG. 10 is a graph illustrating an output value of a phasor correlator including a symbol transition time point.

FIG. 9 is a graph illustrating an output value of a phasor correlator, and FIG. 10 is a graph illustrating an output value of a phasor correlator including a symbol transition time point. In FIG. 10, time points ST1-ST8 in which a phase is 0 correspond to a symbol transition time point.

When a receiver receives a ranging sequence (e.g., 01010101), in an output of a phasor correlator, a time point in which a phase is 0 is averaged and estimated. The receiver uses an estimated value thereof for TOA estimation. In this case, in order to attenuate an effect by noise, by averaging time points over several symbols within a repetition pattern segment, a time point of which a phase is 0 may be found.

Figure 11:
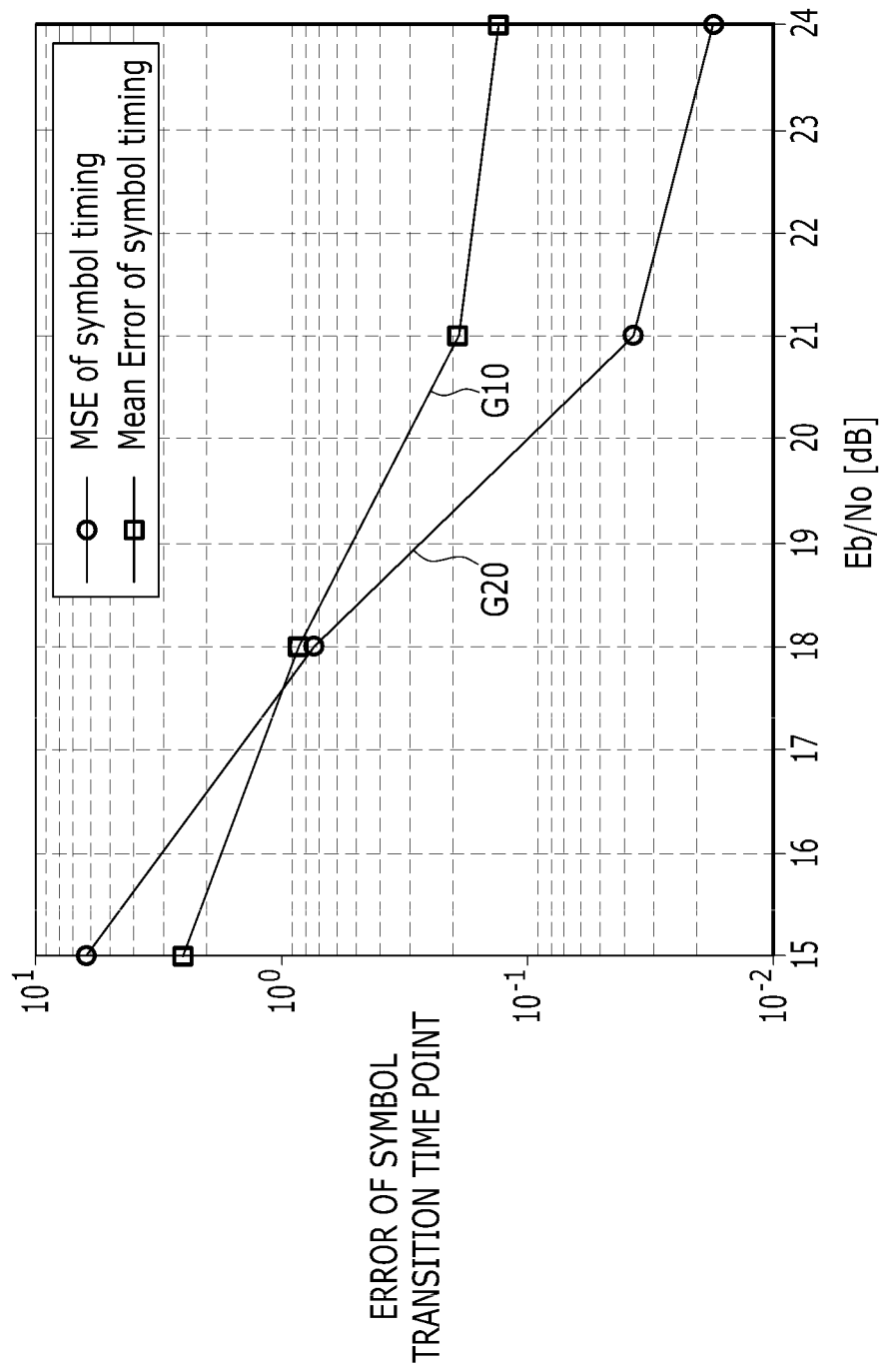
FIG. 11 is a graph illustrating an estimation error according to a method of estimating a symbol transition time point of the present invention.

FIG. 11 is a graph illustrating an error of a symbol transition time point according to a signal-to-noise ratio (SNR) in a method of estimating a symbol transition time point of the present invention. Here, an error of a symbol transition time point is an error between an actual symbol transition time point and an estimated symbol transition time point. A lie G10 represents a mean error of symbol timing of a symbol transition time point, and a line G20 represents a mean square error of symbol timing of a symbol transition time point.

As described above, when estimating a TOA by estimating a symbol transition time point, in an environment using FSK 50 Kbps & 800 Ksps sampling, accuracy corresponding to 0.1 sampling may be obtained, as shown in FIG. 11. When converting to a time, because it corresponds to 0.1 of 800 Ksps sampling, it is an 8 Mbps level and is an error of 125 ns. When this is converted to a distance, it is 37.5 meters, and in a TWR method, an error of 125 ns occurs in both devices and thus a distance error of about 75 meters occurs. A distance error of about 75 meters is a result when using 800 Ksps sampling, and in order to further enhance distance estimation accuracy, the sampling speed may be further increased. A ranging method using an FSK signal has lower accuracy compared with a ranging method using a signal having a relatively large bandwidth, like an OFDM signal. Meanwhile, the ranging method using the FSK signal. However, for location capability of a mode II TVBD or a mode I TVBD that introduces only the FSK PHY, the ranging method may be usefully used.

The above-described method of ranging an FSK PHY transmitter/receiver that is described with reference to FIGS. 5 to 11 may be similarly applied to an OFDM PHY transmitter/receiver. In a situation in which a specific pattern is searched for in a time domain and in which a time (e.g., TOA) is defined, an OFDM symbol synchronization sequence may be used in an existing OFDM PHY transmitter/receiver, but such a method cannot guarantee accuracy. That is, when using a complicated sequence rather than a repeated pattern at a location that performs sampling, an opportunity that can average a measurement value decreases and thus accuracy is deteriorated. In order to enhance accuracy, it is preferable that the OFDM PHY transmitter/receiver estimates a TOA using a repeated signal pattern. For example, when applying data to at least one specific subcarrier of an OFDM symbol and not applying data to the remaining subcarriers, in a time domain, it is output with a single tone or a combination of single tones. In such a case, because a signal has a repetition pattern having a constant cycle, the OFDM PHY receiver estimates a phase transition time point at a specific OFDM symbol location corresponding to a ranging packet (e.g., 01010101) with the above-described method. Thereby, sampling accuracy at a transition time point of an OFDM symbol can be improved (and accuracy of subsampling can be improved). A method of obtaining a phase directly uses a phase of a received signal instead of obtaining a phase by multiplying a signal that delays a received signal by the received signal, as in the above-described FSK PHY transmitter/receiver. In this case, in order to remove an influence of a channel that becomes a problem, an OFDM PHY transmitter of the TVWS WPAN system can combine and transmit a subcarrier that becomes a reference for channel estimation and a subcarrier for ranging.

According to an exemplary embodiment of the present invention, even in an environment (e.g., a weak radio area) where location recognition cannot be performed using a GPS, location capability can be provided.

Further, according to an exemplary embodiment of the present invention, when a TVWS channel cannot be secured, by switching to a band (e.g., a 900 MHz band) other than a TVWS band, seamless TVWS WPAN networking is achievable.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of generating a packet of a physical layer transmitter of a wireless personal area network (WPAN) system that operates a WPAN service in TV white space (TVWS), the method comprising:
   forming a preamble;
   forming a start frame delimiter (SFD) that is positioned after the preamble and that represents the start of a frame;
   forming a first physical layer header that is positioned after the SFD; and
   forming a physical layer service data unit (PSDU) that is positioned after the first physical layer header,
   wherein the forming of a first physical layer header comprises inserting a ranging packet identification bit representing whether a packet is a ranging packet for ranging and a parity bit into the first physical layer header.

2. The method of claim 1, wherein the forming of an SFD comprises selecting one among a first SFD sequence of a 2-byte size and a second SFD sequence of a 3-byte size.

3. The method of claim 1, wherein the forming of a PSDU comprises inserting a null value in which a location thereof is a reference location in which channel state monitoring is performed into the PSDU.

4. The method of claim 1, wherein
   the forming of a PSDU comprises inserting a ranging sequence into the PSDU when the packet is the ranging packet, and the ranging sequence is a sequence in which 0 and 1 are alternately repeated.

5. The method of claim 4, wherein the inserting of a ranging sequence into the PSDU comprises inserting the ranging sequence immediately after the first physical layer header.

6. The method of claim 4, wherein the inserting of a ranging sequence into the PSDU further comprises inserting the ranging sequence into a point that is separated by a predetermined distance from a start location of the PSDU.

7. The method of claim 6, wherein the inserting of a ranging sequence into the PSDU further comprises inserting a bit pattern in which "10" is repeated when an immediately preceding bit of a point into which the ranging sequence is inserted is 0, and inserting a bit pattern in which "01" is repeated when an immediately preceding bit of a point into which the ranging sequence is inserted is 1.

8. The method of claim 7, wherein a start point of the ranging sequence becomes a first reference point for estimating a packet time of arrival (TOA) that is used for ranging.

9. The method of claim 1, wherein the preamble has a bit pattern in which 0 and 1 are alternately repeated, and
a portion of the preamble is used as a ranging sequence when the packet is the ranging packet.

10. The method of claim 9, wherein a start location of the SFD becomes a first reference point for estimating a packet TOA that is used for ranging.

11. The method of claim 1, wherein the physical layer transmitter is a physical layer transmitter using a frequency shift keying (FSK) modulation method.

12. A method of transmitting a packet of a physical layer transmitter of a WPAN system operating a WPAN service in TVWS, the method comprising:
generating a packet comprising a preamble, an SFD, a first physical layer header, and a PSDU; and
modulating and transmitting the generated packet,
wherein the generating of a packet comprises inserting a ranging packet identification bit that represents whether the packet is a ranging packet for ranging and a parity bit into the first physical layer header.

13. The method of claim 12, wherein the generating of a packet further comprises inserting a ranging sequence into the PSDU when the packet is the ranging packet.

14. The method of claim 13, wherein the ranging sequence is a sequence in which 0 and 1 are alternately repeated.

15. The method of claim 12, wherein the generating of a packet further comprises inserting a null value in which a location thereof is a reference location in which channel state monitoring is performed into the PSDU.

16. The method of claim 12, wherein
the ranging packet identification bit corresponds to a reserved bit of a second physical layer header in a smart utility network (SUN) system or a low energy critical infrastructure monitoring (LECIM) system, and
the physical layer transmitter is a physical layer transmitter using a frequency shift keying (FSK) modulation method.

17. A method of ranging of a physical layer transmitter of a WPAN system operating a WPAN service in TVWS, the method comprising:
transmitting a ranging packet comprising a synchronization header (SHR) for synchronization with a receiver, a physical layer header comprising a ranging packet identification bit representing that a packet is a ranging packet for ranging and a parity bit, and a PSDU into which a first ranging sequence in which 0 and 1 are alternately repeated is inserted, to the receiver;
receiving a response packet comprising a second ranging sequence in which 0 and 1 are alternately repeated, from the receiver;
estimating a packet TOA using a symbol transition time point of the second ranging sequence; and
calculating a time of flight (TOF) to the receiver using the estimated TOA.

18. The method of claim 1, wherein the forming of a first physical layer header further comprises inserting an FCS type bit representing a type of a frame check sequence (FCS) for detecting a transmission error, a data whitening bit, and a frame length bit representing a frame length into the first physical layer header.

19. The method of claim 2, wherein
the ranging packet identification bit corresponds to a reserved bit of a second physical layer header in a smart utility network (SUN) system or a low energy critical infrastructure monitoring (LECIM) system,
the first physical layer header comprises a first bit corresponding to a mode switch bit of the second physical layer header in the SUN system or corresponding to a physical layer header length bit of the second physical layer header in the LECIM system, and
the forming of a first physical layer header further comprises
setting the first bit to 0 for compatibility with the SUN system and setting the first bit to 1 for compatibility with the LECIM system.

20. The method of claim 19, wherein
the first SFD sequence is for compatibility with the SUN system, and
the second SFD sequence is for compatibility with the LECIM system.

* * * * *